(12) United States Patent
Nicholson et al.

(10) Patent No.: US 9,607,137 B2
(45) Date of Patent: Mar. 28, 2017

(54) VERBAL COMMAND PROCESSING BASED ON SPEAKER RECOGNITION

(71) Applicant: LENOVO (Singapore) PTE, LTD., New Tech Park (SG)

(72) Inventors: John Weldon Nicholson, Cary, NC (US); Robert A. Bowser, Cary, NC (US); Atsushi Kumaki, Zushi (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 143 days.

(21) Appl. No.: 14/109,669

(22) Filed: Dec. 17, 2013

(65) Prior Publication Data

US 2015/0170643 A1 Jun. 18, 2015

(51) Int. Cl.
| | |
|---|---|
| *G10L 17/20* | (2013.01) |
| *G06F 21/32* | (2013.01) |
| *G10L 15/22* | (2006.01) |
| *G10L 17/22* | (2013.01) |
| *G10L 15/02* | (2006.01) |

(52) U.S. Cl.
CPC .............. *G06F 21/32* (2013.01); *G10L 15/22* (2013.01); *G10L 17/22* (2013.01); *G10L 2015/025* (2013.01); *G10L 2015/223* (2013.01)

(58) Field of Classification Search
CPC .................................................... G10L 15/187
USPC .......................................................... 704/254
See application file for complete search history.

(56) References Cited

U.S. PATENT DOCUMENTS

| | | | | |
|---|---|---|---|---|
| 2005/0209858 | A1* | 9/2005 | Zak | H04W 76/005 704/275 |
| 2007/0061420 | A1* | 3/2007 | Basner | G06Q 10/10 709/217 |
| 2010/0145707 | A1* | 6/2010 | Ljolje | G10L 15/187 704/267 |
| 2012/0065968 | A1* | 3/2012 | Grundmann | G10L 15/08 704/231 |
| 2012/0245941 | A1* | 9/2012 | Cheyer | G10L 17/24 704/246 |
| 2013/0317828 | A1* | 11/2013 | Greenzeiger | G06Q 30/0251 704/275 |
| 2015/0081295 | A1* | 3/2015 | Yun | G10L 17/005 704/236 |

FOREIGN PATENT DOCUMENTS

KR    20020024742 A   *  4/2002

* cited by examiner

*Primary Examiner* — David Hudspeth
*Assistant Examiner* — Shreyans Patel
(74) *Attorney, Agent, or Firm* — Kunzler Law Group (57) ABSTRACT

For verbal command processing, a phoneme module selects recognition phonemes from a phoneme input stream. A user recognition module selects a user profile for a user recognized based on the recognition phonemes. The command module processes a command concurrently identified from the phoneme input stream based on the user profile.

8 Claims, 5 Drawing Sheets

FIG. 1

| | User 205 | Permissions 210 | Customized Actions 215 | Speech Profiles 230 |
|---|---|---|---|---|
| 200a | Admin | Global Edit Global Delete | | Admin Profile 230a |
| 200b | Tom | Account Edit Account Delete | Open Outlook = Calendar | Tom Profile 230b |
| 200c | Sally | Account Edit Account Delete | Open Google Calendar = Calendar | Sally Profile 230c |
| 200d | Guest | Account View | | |

VERBAL COMMAND PROCESSING BASED ON SPEAKER RECOGNITION

FIELD

The subject matter disclosed herein relates to verbal command processing and more particularly relates to verbal command processing based on speaker recognition.

BACKGROUND

Description of the Related Art

Electronic devices are often configured to respond to verbal commands. Users may customize verbal commands.

BRIEF SUMMARY

An apparatus for verbal command processing is disclosed. The apparatus includes a processor and a memory. The memory may store code executable by the processor and comprising a phoneme module, a user recognition module, and a command module. The phoneme module selects recognition phonemes from the phoneme input stream. The user recognition module selects a user profile for a user recognized based on the recognition phonemes. The command module processes a command concurrently identified from the phoneme input stream based on the user profile. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Descriptions of Figures may refer to elements described in previous Figures, like numbers referring to like elements.

Figure 1:
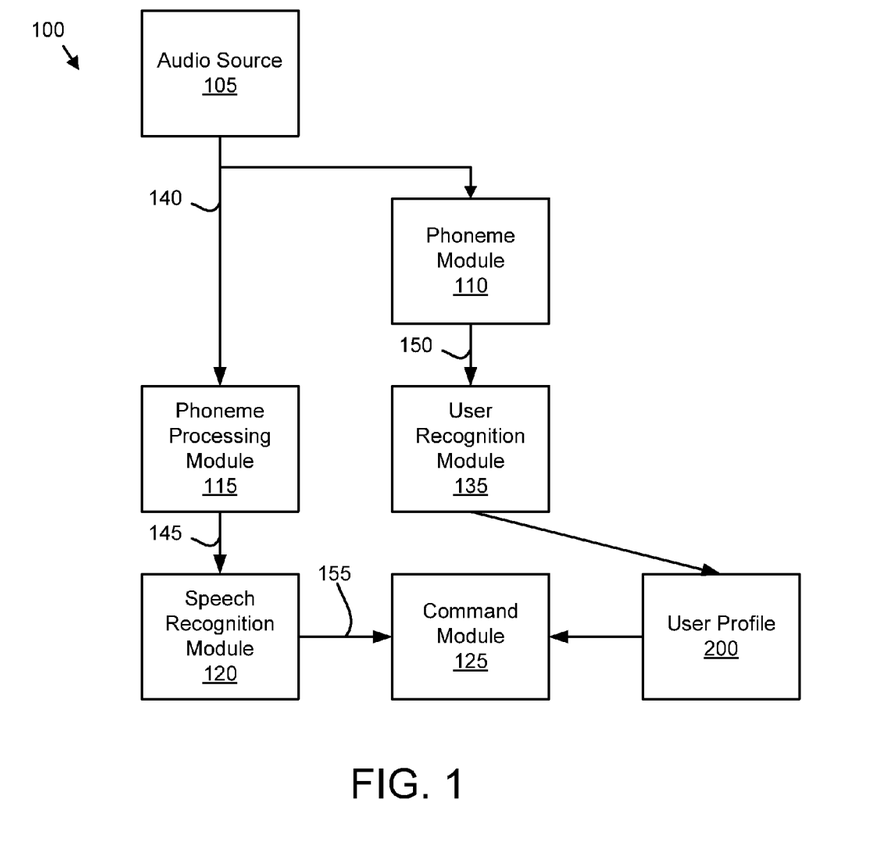
FIG. 1 is a schematic block diagram illustrating one embodiment of a verbal command system.

FIG. 1 is a schematic block diagram illustrating one embodiment of a verbal command system 100. The system 100 may recognize and execute verbal commands spoken by a user. In the depicted embodiment, the system 100 includes an audio source 105, a phoneme module 110, a phoneme processing module 115, a speech recognition module 120, a user recognition module 135, a command module 125, and user profiles 200.

The audio source 105 may include a microphone that receives audible signals and converts the audible signals into electrical audio signals. In addition, the audio source 105 may digitize the audio signals.

In an alternative embodiment, the audio source 105 receives the audio signal from another device. For example, the audio source 105 may receive the audio signal from the other device over a network such as the Internet, a Wi-Fi network, a mobile telephone network, a wide area network, a local area network, a Bluetooth network, or the like. The other device may receive the audible signal, generate the audio signal, and communicate the audio signal to the audio source 105.

The audio source 105 may generate a phoneme input stream 140. The phoneme input stream may be the audio signal. Alternatively, the phoneme input stream 140 may be a stream of discrete phonemes that are segmented from the audio signal.

The phoneme processing module 115 may normalize the phonemes of the phoneme input stream 140 for speech recognition. In one embodiment, the phoneme processing module 115 normalizes the phonemes to a specified vocal track length.

The speech recognition module 120 may identify speech elements including commands 155 from the normalized phonemes 145. In one embodiment, the speech recognition module 120 may employ a hidden Markov model to identify the speech elements.

In the past, the recognized commands 155 in the speech elements would then be executed. For example, if the user spoke the command 155 "save file," the command 155 would be recognized and executed, saving the file.

Users often customize actions associated with specified commands 155. For example, a user may customize the action associated with the command 155 "calendar" to specify the opening of the specified calendar application. If the user had customized the actions associated with a specified command 155, the customized actions would only be executed if the user profile 200 for the user was active. Thus if the first user had customized "calendar" to specify the opening of a first calendar application, the user profile 200 for the first user must be active for the first calendar application to be opened in response to recognizing the command 155 "calendar."

The embodiments described herein process commands 155 based on a user profile 200 selected concurrently from the speech of the command 155. As a result, when the first user speaks the command 155 "calendar," the first user is recognized and the first user profile 200 is selected. The command 155 "calendar" is processed concurrently based on the first user profile, resulting in a customized action such as the execution of the first calendar application.

In addition, some actions that are associated with commands 155 may be permissible for some users but not permissible for other users. For example, the first user may have the requisite permissions to delete an account while a second user may not have the requisite permissions to delete an account. However, if the user profile 200 for the first user is active and the second user speaks the command 155 "delete account," in the past, the command 155 would be recognized and the action executed, deleting the account, even though the second user lacked the requisite permissions to delete the account.

The embodiments described herein process commands 155 identified from the phoneme input stream 140 based on a permission for the user to execute the command in the user profile 200. As a result, a first user with the requisite permission for a first command 155 may be able to speak the first command 155 and have the first command 155 executed, while a second user without the requisite permission for the first command 155 will not be able to execute the first command 155.

In one embodiment, the phoneme module 110 selects recognition phonemes 150 from the phoneme input stream 140. A selection of the recognition phonemes 150 is described hereafter in greater detail.

The user recognition module 135 may recognize a user from the recognition phonemes 150. In one embodiment, the user recognition module 135 compares the recognition phonemes 150 from the phoneme input stream to stored recognition phonemes in order to recognize the user. The user recognition module 135 may select a user profile 200 for the user recognized based on the recognition phonemes.

The command module 125 may process the command 155 that is concurrently identified from the phoneme input stream 140 based on the selected user profile 200. The user profile 200 may include a permission for the user to execute the command 155. Alternatively, the user profile 200 may include a customized action associated with the command 155.

The command module 125 may execute the command 155 if the user profile 200 for the recognized user includes the permission for the command 155. In addition, the command module 125 may translate the command 155 into a customized action associated with the command 155 in the user profile 200 and execute the customized action.

Figure 2:
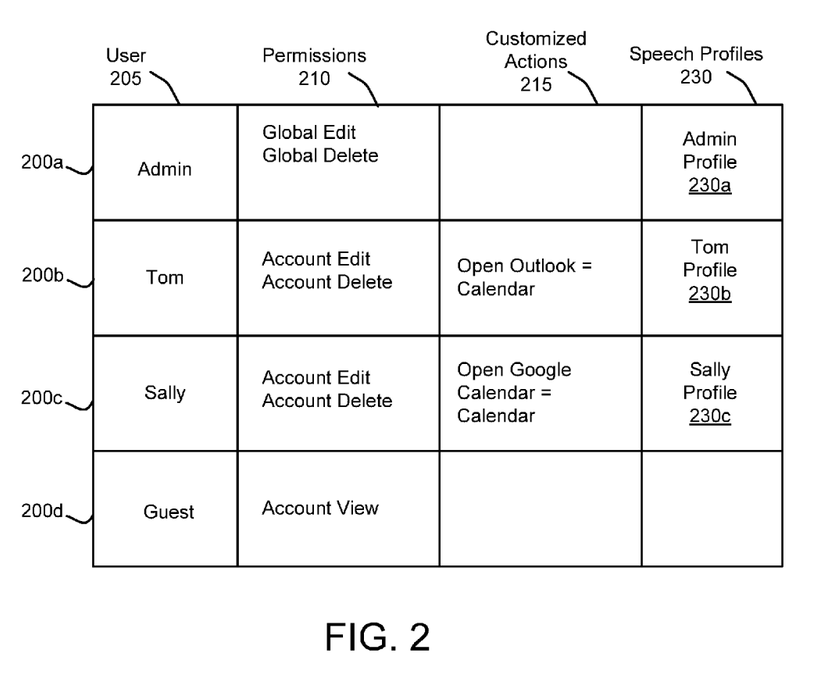
FIG. 2 is a schematic block diagram illustrating one embodiment of user profiles.

FIG. 2 is a schematic block diagram illustrating one embodiment of the user profiles 200. The user profiles 200 may be embodied in a database, in linked data structures, in a flat file, or combinations thereof. Each user profile 200 may be for a specified user 205. In one embodiment, a specified user 205 has one or more user profiles 200. Each user profile 200 may record permissions 210 and customized actions 215 for a specified role of the user 205.

In one embodiment, each user profile 200 includes permissions 210 for the user 205 to execute one or more commands 155. For example, in the depicted embodiment, the user 205 "Tom" has permissions to execute "account edit" and "account delete" commands.

Each user profile 200 may also include customized actions 215 associated with commands 155. For example, the user 205 "Tom" has the specified command 155 "calendar" associated with a MICROSOFT® Outlook calendar application.

In addition, some user profiles 200 may include speech profiles 230. Each speech profile 230 may include data that is used to identify the associated user 205 as will be described hereafter.

Figure 3:
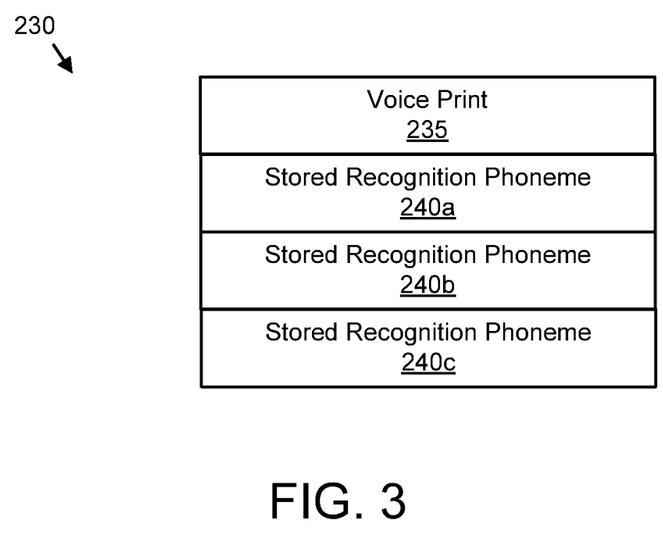
FIG. 3 is a schematic block diagram illustrating one embodiment of a speech profile.

FIG. 3 is a schematic block diagram illustrating one embodiment of a speech profile 230. The speech profile 230 may be embodied in a database, in linked data structures, in a flat file, or combinations thereof. In the depicted embodiment, the speech profile 230 includes a voice print 235 and one or more stored recognition phonemes 240.

In one embodiment, the voice print 235 comprises a spectrogram generated from a Fourier transform of user speech. Alternatively, the spectrogram may be generated using a filter bank that divides the user speech into a plurality of frequency ranges. The voice print 235 may be compared to the phoneme input stream 140 to identify a user 205.

The stored recognition phonemes 240 may be selected from the user speech for the user 205. In one embodiment, specific stored recognition phonemes 240 are selected from the user speech for each user. The stored recognition phonemes 240 may include a specified set of specific phonemes that are used to recognize the user 205. The stored recognition phonemes 240 may be compared to the recognition phonemes to identify the user 205.

Figure 4:
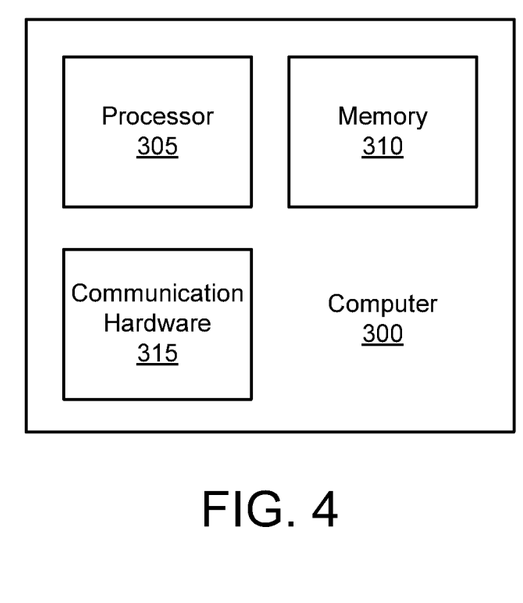
FIG. 4 is a schematic block diagram illustrating one embodiment of a computer.

FIG. 4 is a schematic block diagram illustrating one embodiment of a computer 300. The system 100 may be embodied in the computer 300. The computer 300 may be a laptop computer, a computer workstation, a server, a tablet computer, an eyeglass computer, a wearable computer, a mobile telephone, or the like. In the depicted embodiment, the computer 300 includes a processor 305, a memory 310, and communication hardware 315.

The memory 310 may be a semiconductor storage device, a hard disk drive, an optical storage device, a micromechanical storage device, or combinations thereof. The memory 310 may store code. The code may be executed by the processor 305. The communication hardware 315 may communicate with other devices including but not limited to a microphone, the Internet, or a device that includes the microphone.

Figure 5:
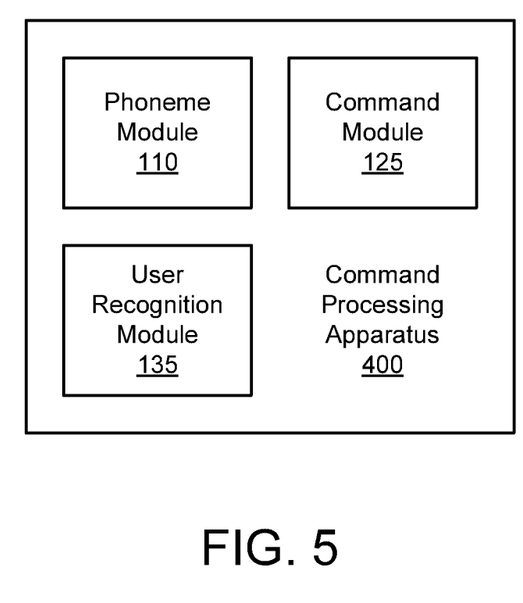
FIG. 5 is a schematic block diagram illustrating one embodiment of a command processing apparatus.

FIG. 5 is a schematic block diagram illustrating one embodiment of a command processing apparatus 400. The apparatus 400 may be embodied in the computer 300. In the depicted embodiment, the apparatus 400 includes the phoneme module 110, the command module 125, and the user recognition module 135. The phoneme module 110, the command module 125, and the user recognition module 135 may be embodied in a computer readable storage medium such as the memory 310. The computer readable storage medium may store code that is executable by the processor 305 to perform the functions of the phoneme module 110, the command module 125, and the user recognition module 135.

The phoneme module 110 selects recognition phonemes 150 from the phoneme input stream 140. The user recognition module 135 selects a user profile 200 for a user recognized based on the recognition phonemes 150. The command module 125 processes a command 155 concurrently identified from the phoneme input stream 140 based on the user profile 200.

Figure 6:
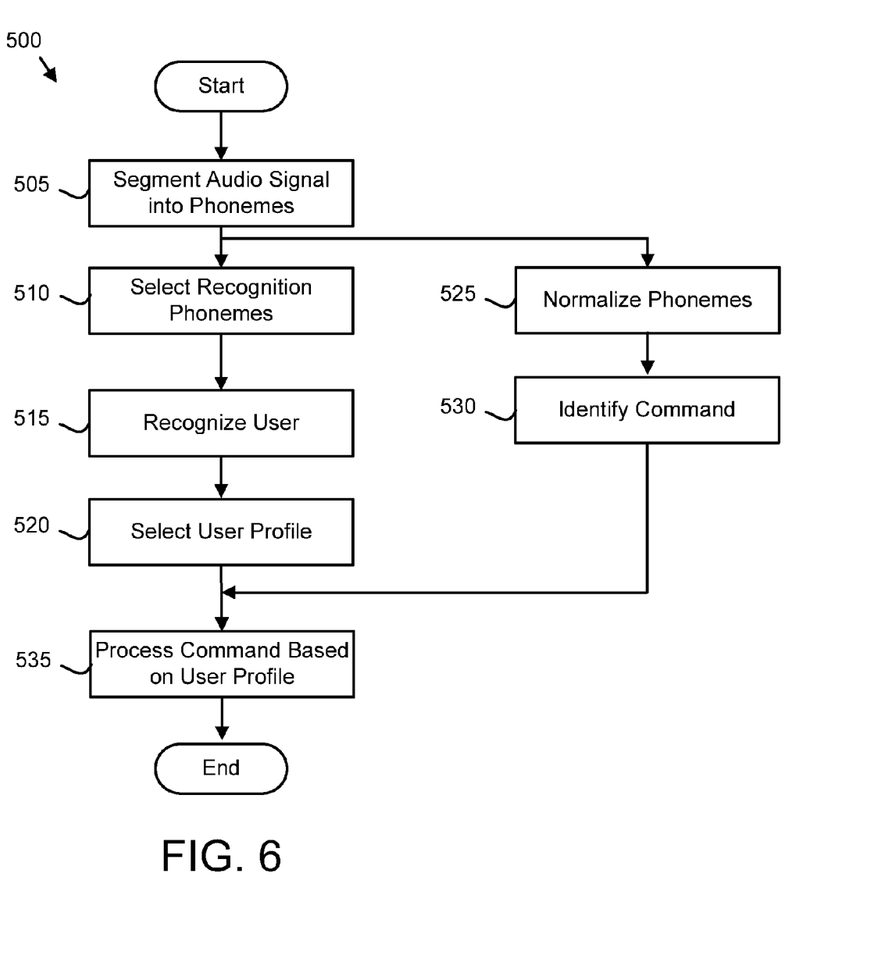
FIG. 6 is a schematic flow chart diagram illustrating one embodiment of a command processing method.

FIG. 6 is a schematic flow chart diagram illustrating one embodiment of a command processing method 500. The method 500 may process a command 155 identified from the phoneme input stream 140 based on a selected user profile 200. The method 500 may perform the functions of the system 100 and apparatus 400.

In one embodiment, the method 500 is performed by use of the processor 305. Alternatively, the method 500 may be performed by a program product. The program product may include a computer readable storage medium such as the memory 310 that stores code. The code may be executed by the processor 305 to perform the functions of the method 500.

The method 500 starts, and in one embodiment, the audio source 105 segments 505 the audio signal into the phoneme input stream 140. In one embodiment, the audio source 105 may define a plurality of states for each phoneme of the audio signal and a plurality of Gaussian distributions for each state of the phoneme. The phoneme input stream 140 may be segmented 505 where the Gaussian distribution for a first most likely state and the Gaussian distribution for a second most likely adjoining state each fall below a distribution threshold. Alternatively, the audio source 105 may employ an average level crossing rate to determine where to segment 505 the audio signal into the phonemes of the phoneme input stream 140.

In one embodiment, the phoneme module 110 selects 510 recognition phonemes 150 from the phoneme input stream 140. In one embodiment, the recognition phonemes 150 match one or more specified phoneme frequency profiles. Alternatively, the recognition phonemes 150 may be identified from acoustic features.

In one embodiment, the phoneme module 110 selects a specified set of recognition phonemes 150. The specified set of recognition phonemes 150 may correspond to the stored recognition phonemes 240. For example, the specified set of recognition phonemes 150 may include three vowel phonemes and six hard consonant phonemes corresponding to the same three vowel phonemes and six hard consonant phonemes of the stored recognition phonemes 240.

The user recognition module 135 may recognize 515 the user from the recognition phonemes 150. In one embodiment, the user recognition module 135 compares the recognition phonemes 150 to the stored recognition phonemes 240 for each user 205. The user recognition module 135 may recognize 515 the user 205 as the speaker in response to the user's stored recognition phonemes 240 matching the recognition phonemes 150.

In one embodiment, the user recognition module 135 calculates a phoneme score for each user 205. The phoneme score may be calculated as a sum of differences between each recognition phoneme 150 and each corresponding stored recognition phoneme 240. The user recognition module 135 may recognize 515 the user 205 with the lowest phoneme score.

In an alternate embodiment, the user recognition module 135 compares a spectrogram of the recognition phonemes 150 to the voice print 235. The user recognition module 135 may select the user 205 with the voice print 235 that most closely matches the spectrogram of the recognition phonemes 150.

The user recognition module 135 may further select 520 a user profile 200 for the user recognized 515 based on the recognition phonemes 150. For example, if the recognition phonemes 150 most closely match the stored recognition phonemes 240 of the "Sally profile 230c" as depicted in FIG. 2, the user recognition module 135 may select the user profile 200c for the user 205 "Sally."

In one embodiment, the phoneme processing module 115 normalizes 525 the vocal track links of the phonemes of the phoneme input stream 140 to generate the normalized phonemes 145. In one embodiment, the phoneme processing module 115 normalizes a length of each phoneme in the phoneme input stream 142 a standard temporal length. In addition, the phoneme processing module 115 may modify the peak amplitude of each phoneme to a target level. Alternatively, the phoneme processing module 115 may modify each phoneme so that an average amplitude of the phoneme is equal to an average target level.

The speech recognition module 120 may identify 530 the command 155 from the phoneme input stream 140. In a certain embodiment, the speech recognition module 120 identifies 530 the command 155 from the normalized phonemes 145. The speech recognition module 120 may identify 530 the command 155 using a hidden Markov model to identify the speech elements. In addition, the speech recognition module 120 may identify the command 155 from a table of commands. Alternatively, the speech recognition module 120 may identify 530 the command 155 from the customized actions 215 of the user profiles 200.

In one embodiment, the command module 125 processes 535 the command 155 concurrently identified from the phoneme input stream 140 based on the user profile 200 and the method 500 ends. The user profile 200 may be the user profile 200 for the recognized user 205 that was selected 520 by the user recognition module 135.

In one embodiment, the command module 125 consults the user profile 200 for the user 205 to determine if the user 205 has the requisite permissions 210 to execute the command 155. If the user profile 200 indicates that the user 205 has the requisite permissions 210 to execute command 155, the command module 125 may execute the command 155.

In one embodiment, the command module 125 consults the user profile 200 to determine if there is a customized action 215 associated with the command 155. The command module 125 may translate the command 155 into the customized action 215 and execute the customized action 215.

For example, if the user 205 is "Sally" as depicted FIG. 2 and the command 155 is "calendar," the command module 125 may determine that opening a GOOGLE® calendar is the customized action 215 for the command 155 "calendar."

The command module 125 may further process 535 the command 155 by executing the customized action 215.

In one embodiment, the command module 125 first consults the user profile 200 to determine the customized action 215 that corresponds to the command 155. Subsequently, the command module 125 may consult the permissions 210 of the user profile 200 to determine if the user 205 has the requisite permissions 210 to execute the customized action 215.

The embodiments recognize the user 205 based on the recognition phonemes 150 selected from the phoneme input stream 140 and select a user profile 200 for the user 205 while concurrently with identifying the command 155 from the phoneme input stream 140. As a result, the same phoneme input stream 140 is used both to identify the command 155 and recognize the user 205 who is speaking the command 155.

The embodiments further process the command 155 based on the user profile 200 of the recognized user 205 that is speaking the command 155. The embodiments may only execute the command 155 if the user profile 200 for the speaking user 205 indicates that the user 205 has the requisite permissions to execute the command 155. In addition, the embodiments may only execute a customized action 215 associated with the command 155 and specified in the user profile 200 in response to identifying the command 155.

As a result, the embodiments may only execute a command 155 if the speaker of the command 155 has the requisite permissions 210 to execute command 155. This may allow multiple speakers to give commands 155 to the system 100 with the system 100 discriminating whether each speaker/user 205 has the requisite permissions 210 to execute each identified command 155.

In addition, customized actions 215 of each of the multiple speakers/users 205 may be performed. The embodiments permit each user 205 to use a same verbal command 155 to perform a different customized action 215. For example, referring to the user profiles 200 of FIG. 2, the users 205 "Tom" and "Sally" may each use the command 155 "calendar" to perform different customized actions 215. The embodiments therefore allow multiple users 205 to communicate commands 155 to the audio source 105 with each command 155 processed as is appropriate for the user 205.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
select recognition phonemes from a phoneme input stream that correspond to stored recognition phonemes by segmenting the phoneme input stream using an average level crossing rate to determine each recognition phoneme;
select a first user profile from a plurality of user profiles for a first user recognized based on the recognition phonemes, wherein each user profile comprises one or more permissions, one or more customized actions, and one or more speech profiles, each permission allows the execution of an associated command, and each customized action is only executed if the first user profile is active; and
process a command concurrently identified from the phoneme input stream from a second user in response to the first user profile comprising a permission for the first user to execute the associated command;
retrieve a customized action associated with the command from the first user profile; and
in response to the first user profile being active, execute the customized action.

2. The apparatus of claim 1 wherein the code is further executable by the processor to recognize the first user and the second user from a comparison of the recognition phonemes to the stored recognition phonemes.

3. A method comprising:
selecting, by use of a processor, recognition phonemes from a phoneme input stream that correspond to stored recognition phonemes by segmenting the phoneme input stream using an average level crossing rate to determine each recognition phoneme;
selecting a first user profile from a plurality of user profiles for a first user recognized based on the recognition phonemes, wherein each user profile comprises one or more permissions, one or more customized actions, and one or more speech profiles, each permission allows the execution of an associated command, and each customized action is only executed if the first user profile is active;
processing a command concurrently identified from the phoneme input stream from a second user in response to the first user profile comprising a permission for the first user to execute the associated command;
retrieve a customized action associated with the command from the first user profile; and
in response to the first user profile being active, executing the customized action.

4. The method of claim 3, the method further comprising:
segmenting an audio signal into the phoneme input stream;
recognizing the first user and the second user from the recognition phonemes; and
identifying the command from the phoneme input stream.

5. The method of claim 3, the method further comprising normalizing vocal track lengths of phonemes of the phoneme input stream.

6. A program product comprising a non-transitory computer readable storage medium that stores code executable by a processor to perform:
selecting recognition phonemes from a phoneme input stream that correspond to stored recognition phonemes by segmenting the phoneme input stream using an average level crossing rate to determine each recognition phoneme;
selecting a first user profile from a plurality of user profiles for a first user recognized based on the recognition phonemes, wherein each user profile comprises one or more permissions, one or more customized actions, and one or more speech profiles, each permission allows the execution of an associated command, and each customized action is only executed if the first user profile is active;
processing a command concurrently identified from the phoneme input stream from a second user in response to the first user profile comprising a permission for the first user to execute the associated command;

retrieve a customized action associated with the command from the first user profile; and in response to the first user profile being active, executes the customized action.

7. The program product of claim 6, the processor further:

segmenting an audio signal into the phoneme input stream;

recognizing the first user and the second user from the recognition phonemes; and identifying the command from the phoneme input stream.

8. The program product of claim 6, the processor further normalizing vocal track lengths of phonemes of the phoneme input stream.

* * * * *